W. Hotine,
Bread Machine.
No 57,908. Patented Sep. 11, 1866.
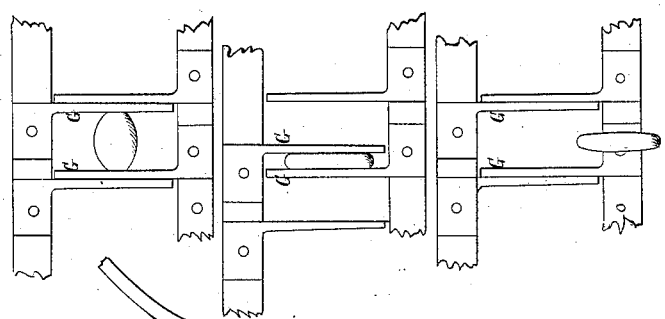
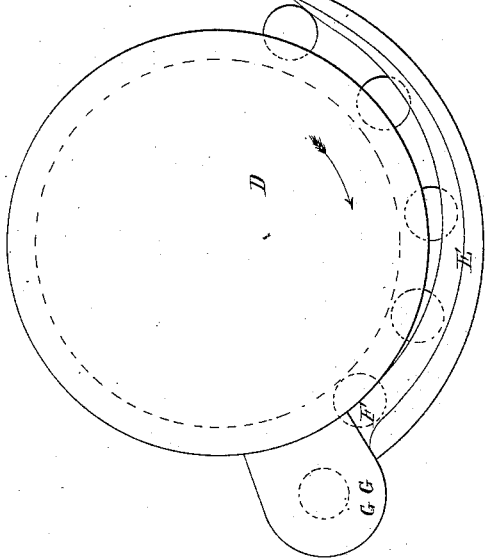
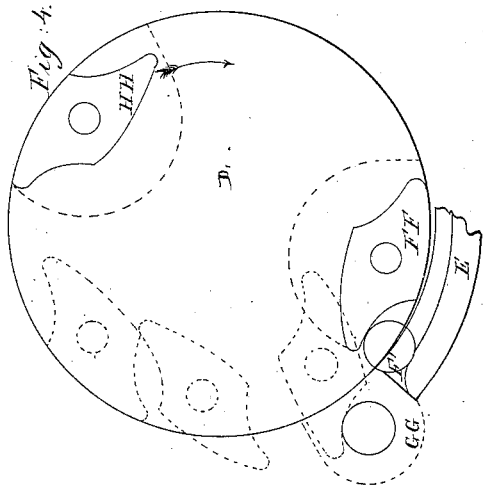
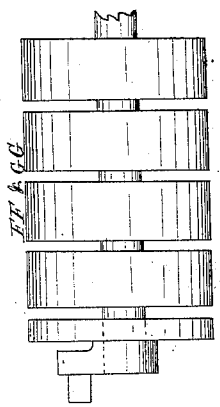
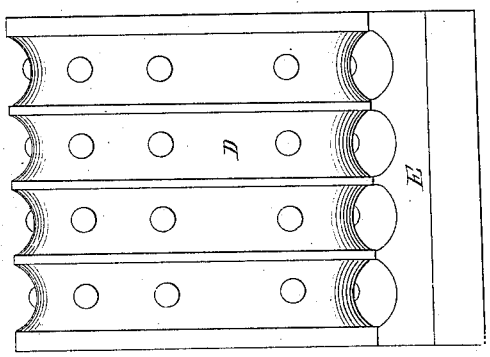
Witnesses:
Inventor
William Hotine

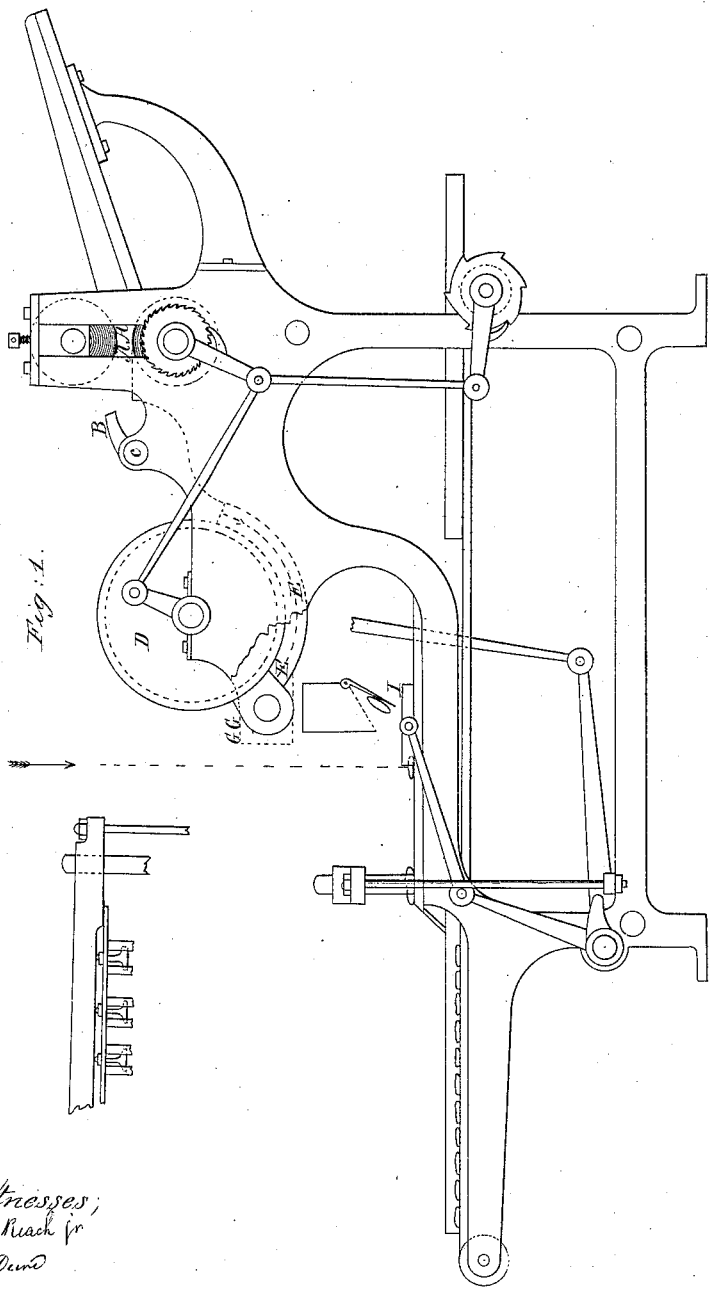

UNITED STATES PATENT OFFICE.

WILLIAM HOTINE, OF BROOKLYN, NEW YORK.

IMPROVED MACHINE FOR MOLDING AND SHAPING DOUGH INTO LOAVES OR CRACKERS.

Specification forming part of Letters Patent No. 57,908, dated September 11, 1866.

*To all whom it may concern:*

Be it known that I, WILLIAM HOTINE, of the Eastern District of the city of Brooklyn, Long Island, in the State of New York, have invented a new and useful Machine for Molding Pieces of Dough into Loaves and Crackers; and I do hereby declare that the following is a full, clear, and exact description of the construction and operation of the same, reference being had to the annexed drawings, making a part of this specification, in which—

Figure 1 represents a side elevation; Fig. 2, a front view of parts D E; Fig. 3, a side section of D E; Fig. 4, mode of action of F F; Fig. 5, mode of action of G G.

A A, Fig. 1, are a pair of plain rollers, through which a sheet of dough is fed to the machine by an intermittent motion communicated by ratchet and pawl, as shown. B is a rotating knife or cutting-bar on shaft C. As the sheet of dough is fed within the verge of action of said knife a strip is cut off at each revolution.

D is an apparatus that I term the "molder," which Fig. 2 is a front view. It consists of a cylinder with grooves transverse to its axis, variable form, suitable to the shape of loaves or crackers required. In these grooves are set a number of nipples, molding-points, or projections at proper distance apart, and of such form and in such position as may best suit the purpose required. This cylinder is partially surrounded by a jacket or shell, E, being in fact a part of another cylinder with grooves in its internal surface matching and corresponding to the grooves on cylinder D, the two combined forming a series of channels. (See Fig. 2.)

The strip of dough as cut off by the knife falls into contact with cylinder D. The action of molding then commences, the shell E being stationary. The revolution of cylinder D rolls the strip through the channels.

The nipple-points have the effect of exerting a gentle pressure on the dough, by which a slight friction is blended with a rolling motion, and at the same time insuring a regular and equal progression through the channels.

The ribs or spaces between the grooves of cylinder D do not meet or touch their opposites on the shell E except at the point of exit of pellets E', as shown at section, Fig. 3, the object of which is that in the progression of the strip through the molder, as described, it shall be gradually divided into separate pellets, and during that gradual division the ends as well as the body shall be subjected to the molding process, and become hermetically sealed by skimming over the entire surface, and not until they nearly emerge from the channels are they separated.

The object of the above-described process is to assimilate the well-known manipulation of hands to form a perfect skin-covered surface to each piece of dough, a necessity for all kinds of bread and crackers, as the gases that are generated during baking are in a measure retained for a useful purpose.

The pellets of dough when separated are ejected from the molder by a series of cups I term "placers," F F, attached to and recessed into the face of the molder D. (Shown at Fig. 4.) These cups on arriving at the proper points receive a partially-revolving or trip motion on their own axis by means of an outstanding crank on the end of their shaft working in a stationary guide or cam.

Arranged in front of the molder D are a series of plates, G G, Fig. 5, between each pair of which the pellets of dough are placed by the trip motion of cups F F, as described. The said plates receive horizontal motion by a cam on the side of the molder D, by which they are closed together in pairs sufficiently to flatten the pellets into cakes of dough.

On the plates opening to the first position the cakes (which are apt to adhere) are ejected by another series of cups or discharges, H H, similar to F F, and, like them, attached to and forming part of face of molder D, and receiving a like motion from the same cam or guide. The cakes are then made to fall through a receptacle or box having diverging partitions or guides, which insures their falling on to a table below in a position to be carried forward by a bar, I, sliding over the surface of said table, the edge of which is forked or serrated. This bar slides the cakes into position under the docker, which stamps and finishes them. The row of finished crackers is then displaced by the succeeding row, and falls into a pan ready to receive them, and to which motion is imparted for the purpose of being filled.

In order to be fully understood as to the nature of my claims to novelty on this invention, I will state that I am fully aware that a cylinder and shell such as herein described is in itself not new, similar apparatus having before been used to separate strips of dough into pellets by a rolling motion.

I am also aware that a pair of horizontal plates with grooves parallel to the line of motion are in use for a like purpose; but such apparatus, to the best of my knowledge and belief, have been confined in their purpose to the simple effect of separating strips of dough into pellets of equal size and form, to be afterward subjected to certain manipulations of the hands, which it is my object in this invention to supersede.

I therefore desire to claim as follows:

1. In combination with a grooved cylinder and shell, the use of nipples or molding-points, of any suitable form, set in the grooves, for the purpose as described.

2. The combination of the roller D with the shell E, made and arranged in the manner and for the purpose as described.

3. In combination with a grooved cylinder and shell, the use of the revolving cups F F and H H, or their equivalents, for the purpose of placing and discharging the pellets, as described.

4. The use of flatting-plates G G, in combination with a molding apparatus, such as herein set forth, whereby the pellets are received direct from the molder, for the purpose as herein described.

5. In combination with an apparatus for molding and shaping crackers, &c., the forked or serrated sliding bar I, by which the cakes are brought up in an even line on the table for the operation of the docker.

WILLIAM HOTINE.

Witnesses:
WM. H. DANE,
WM. R. FARMER.